United States Patent
Quintana et al.

[11] Patent Number: 5,970,603
[45] Date of Patent: Oct. 26, 1999

[54] METHOD FOR PROCESSING MAGNETIC READ/WRITE HEADS

[75] Inventors: Dan W. Quintana, Louisville; Chris Broussalian, Broomfield; John Keil, Jr.; Georgene Nielsen, both of Westminster; Jorg Jemelka, Boulder; Robert Chestnutt, Arvada; William Trowbridge, Estes Park, all of Colo.

[73] Assignee: Quantum Peripherals Colorado, Inc., Louisville, Colo.

[21] Appl. No.: 09/047,294

[22] Filed: Mar. 24, 1998

Related U.S. Application Data

[62] Division of application No. 08/550,945, Oct. 31, 1995, abandoned.

[51] Int. Cl.[6] .......................................................... G11B 5/42
[52] U.S. Cl. ..................................... 29/603.12; 29/603.17; 29/559; 451/28; 451/460
[58] Field of Search ........................... 29/603.12, 603.17, 29/559; 451/460, 28; 269/289 R, 295

[56] References Cited

U.S. PATENT DOCUMENTS

| | | |
|---|---|---|
| 4,732,600 | 3/1988 | Schiller . |
| 5,228,666 | 7/1993 | Drake et al. . |
| 5,531,017 | 7/1996 | Church et al. . |
| 5,548,886 | 8/1996 | Kojima et al. . |

*Primary Examiner*—Carl E. Hall
*Attorney, Agent, or Firm*—William J. Kubida, Esq.

[57] ABSTRACT

A tool, and associated method, for batch processing the definition of air bearing surfaces on rows comprising a plurality of sliders is disclosed. The tool has a main body member having a length defining a y-axis direction, a width defining an x-axis direction, and a thickness defining a z-axis direction. The main body member has a top surface defining an upwardly facing z-axis base surface. The main body also defines a y-axis alignment reference surface, and an x-axis alignment reference surface. The rows are positioned on the tool for processing, where the upper surface of the platform engages the lower surface of the plurality of rows to provide proper z-axis positioning on the tool. The y-axis alignment reference engages one longitudinal side of an anchor row to provide proper y-axis positioning, and the x-axis alignment reference surface abuts the second end of the plurality of rows to provide proper x-axis positioning. The top surfaces of the rows lie in a common plane.

4 Claims, 15 Drawing Sheets

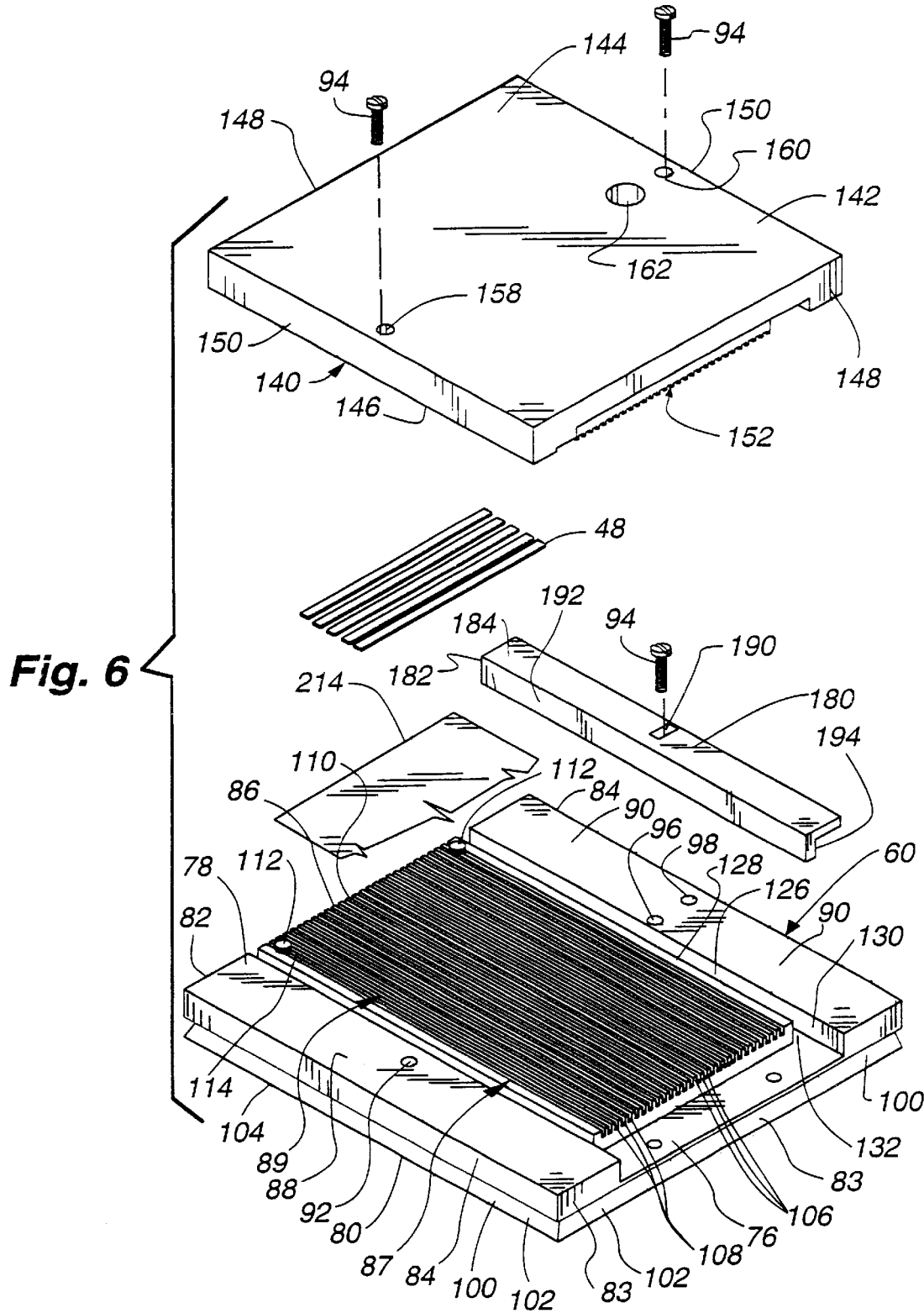

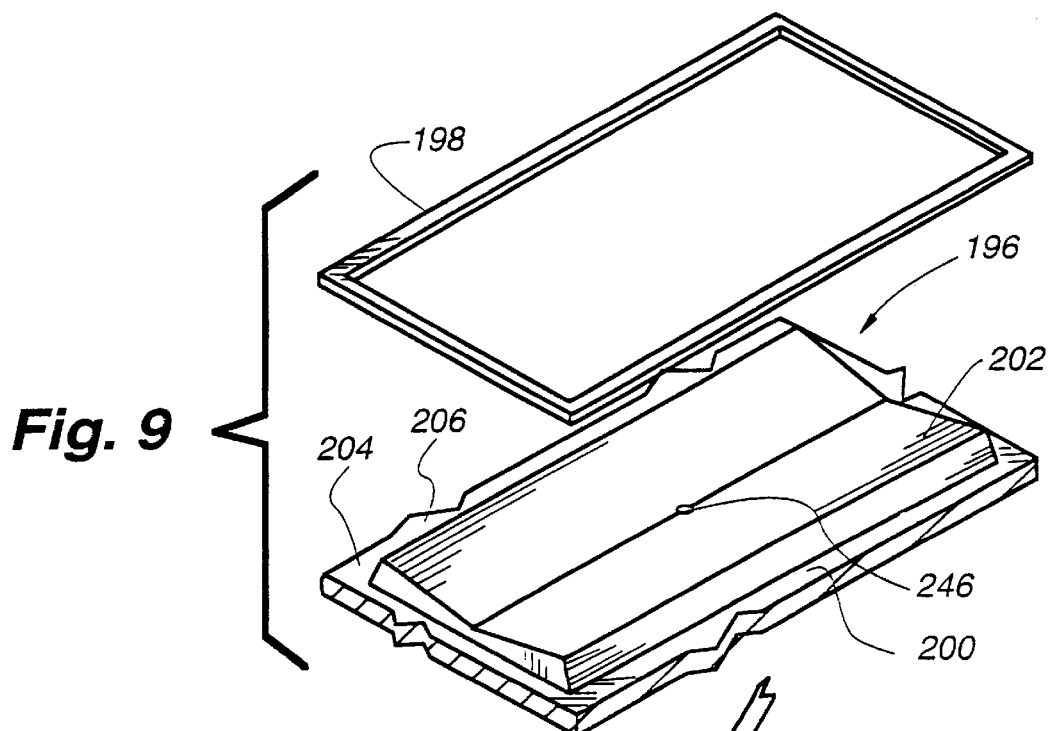
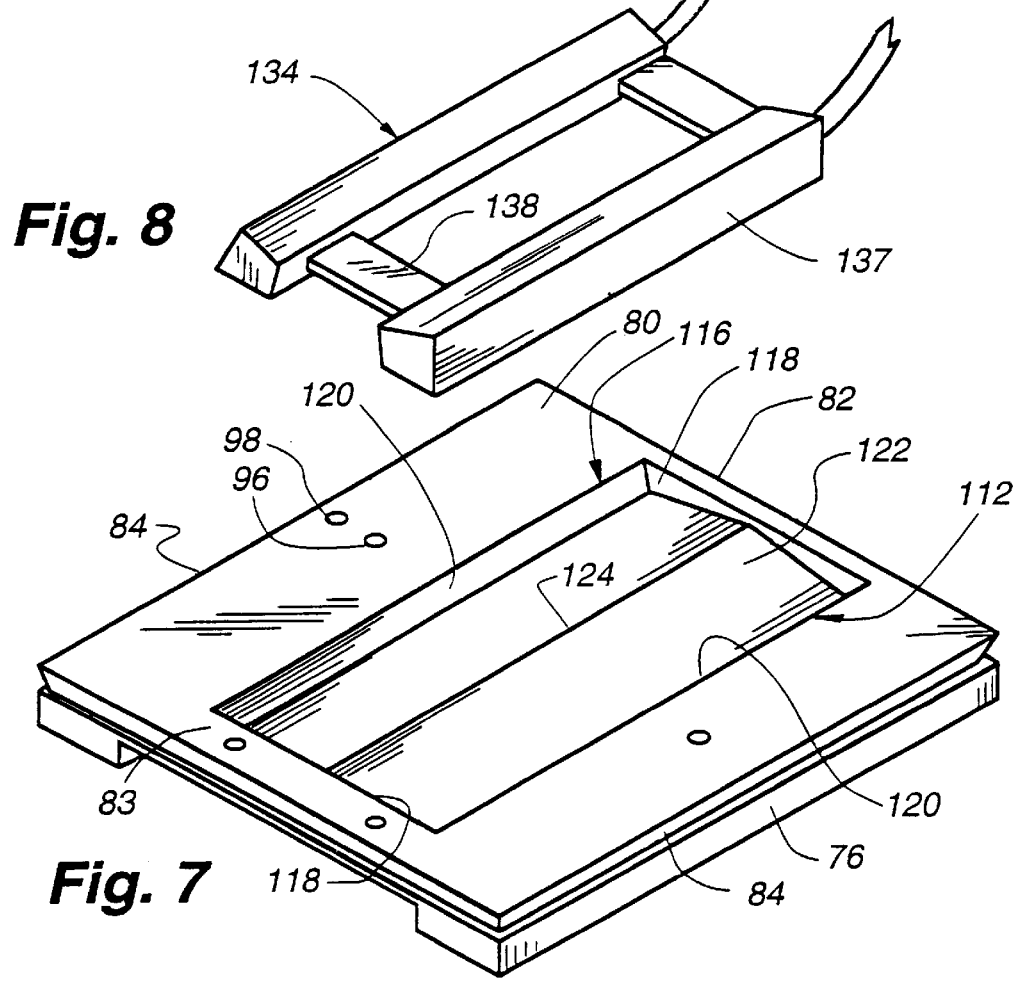

METHOD FOR PROCESSING MAGNETIC READ/WRITE HEADS

RELATED APPLICATION

The present application is a divisional application of U.S. patent application Ser. No. 08/550,945 filed Oct. 31, 1995, now abandoned.

FIELD OF THE INVENTION

This invention relates to a tool for use in manufacturing magnetic recording heads. More particularly, this invention relates to a new and improved tool and associated method for batch processing the definition of air bearing surfaces on magnetic read/write heads.

BACKGROUND OF THE INVENTION

Standard machining processes used for defining air bearings on sliders can no longer be used because of the strict tolerances required for smaller-dimensioned air bearing features on magnetic read/write heads, or sliders. Methods have been developed for defining air bearings on sliders which require the use of more advanced processing technologies, such as photolithography techniques as currently used in integrated circuit processing. One method is plasma defined rail "PDR" processing. PDR processing has been instrumental in the development of several key improvements in disk drive performance, particularly with respect to the performance of the magnetic read/write heads used in disk drives.

The air bearing profiles on sliders are defined when the sliders are still combined together in a flat and thin row, prior to being separated into individual sliders. The PDR processing technology, however, creates a serious manufacturing problem when applied to the individual rows because of the thin film coating (photoresist deposition), reticle alignment, and etching steps required. Single unit PDR processing is very inefficient because individual row handling is time consuming, subjects the rows to a high risk of damage since each fragile row is individually handled several times through the PDR process, and the resulting air bearing profiles can vary widely from row to row. As a result, while PDR processing is necessary to define the required air bearing surfaces, the viability and cost effectiveness of using PDR processing on these thin narrow rows has been limited.

There is missing in the art a tool and associated method which allows for the definition of the air bearing profile on a plurality of individual slider rows in a batch environment. Such a tool would provide uniform processing results across many rows, high production through-put, and a decreased risk of row damage due to frequent handling. It is to overcome the shortcomings of the prior art that the present invention was developed.

OBJECTS AND SUMMARY OF THE INVENTION

It is the principal object of the present invention to provide a tool for use in the batch machining and plasma processing of magnetic read/write heads.

Another object of the present invention is to provide a tool which allows for uniform photo-resist application during PDR processing of air bearing features on rows of sliders.

Still another object of the present invention is to provide a tool which allows gang align and expose capability during PDR processing of air bearing features.

Another object to the present invention is to reduce handling damage and eliminate several operations during the definition of air bearing profiles on magnetic read/write heads.

Other objects of the present invention will become apparent from the following description and accompanying drawings.

The present invention is embodied in a tool for use in defining air bearing surfaces on a plurality of rows, the rows being elongated and defining opposing longitudinal sides, a first end, a second end, a top surface and a bottom surface. The rows each comprise a plurality of individual sliders.

The tool comprises a main body member which has a length defining a y-axis direction, a width defining an x-axis direction, and a thickness defining a z-axis direction. The main body member has a top surface defining a platform, and first and second positioning surfaces, one of each positioned on opposing sides of the platform. The platform has a planar upper surface defining an upwardly facing z-axis base surface, and the platform also defines a y-axis alignment reference surface. The second positioning surface defines an x-axis alignment reference surface.

The rows are positioned on the tool for processing, where the upper surface of the platform engages the lower surface of the plurality of rows to provide proper z-axis positioning on the tool. The y-axis alignment reference engages one longitudinal side of an anchor row to provide proper y-axis positioning, and the x-axis alignment reference surface abuts the second end of the plurality of rows to provide proper x-axis positioning. The subsequent rows positioned on the upper surface of the platform have one longitudinal side engaging the previously positioned row to maintain proper y-axis positioning between rows, and the second ends of each of the rows abuts the x-axis alignment reference surface to provide proper x-axis positioning between the rows, so that the sliders in each row are positioned in y-axis orientation with the corresponding slider in adjacent rows, and the top surfaces of the rows lie in a common plane.

The x-axis alignment reference surface is selectively moveable in the x-axis direction to selectively position the rows on the platform while maintaining the y-axis orientation between the rows.

The platform can define a plurality of beams extending in the y-axis direction. Each of the beams are spaced apart by a groove and define a top end. The top end of the beams lie in a common plane for supporting the bottom surface of the plurality of rows.

A top plate can be releasably engageable with the main body member. The top plate defines a downwardly facing planar z-axis reference surface oriented directly above the upwardly facing z-axis base surface of the platform when the top plate is engaging the main body member to position the top surfaces of the rows in a common plane when an adhesive is positioned between the upwardly facing z-axis base surface of the main body and the rows.

The main body defines a bottom surface, which can in turn define a cavity therein positioned coextensive to the platform for providing improved heat transfer characteristics to and from the platform.

An associated method for using the tool to define an air bearing surface on each of a plurality of rows is also disclosed. The method comprises the steps of providing a tool having a platform defining x, y and z-axis reference surfaces; mounting the rows on the platform such that each slider in each row is oriented identically to corresponding sliders in adjacent rows in the x and y axis directions; moving the top surfaces of the rows such that the top surface of each row lies in a common plane with all other top surfaces, providing z-axis orientation; defining an air bearing structure on each of the sliders in the rows while the plurality of rows are mounted on the platform; sawing through the plurality of rows between the sliders in each row to form individual sliders; and demounting the individual sliders from the platform.

A more complete appreciation of the present invention and its scope can be obtained from understanding the accompanying drawings, which are briefly summarized below, the following detailed description of a presently preferred embodiment of the invention, and the appended claims.

BRIEF DESCRIPTION OF THE DRAWINGS

FIG. 6 is an exploded view of the gang tool of the present invention, illustrating the gang tool, a lateral reference position fence, a top plate, a plurality of rows, each comprising a plurality of read/write heads and a sheet adhesive.

FIG. 7 is a perspective view of the gang tool of the present invention, and illustrates a cavity formed in a backside of the gang tool.

FIG. 8 is a perspective view of a resistive heater for use with the gang tool of the present invention.

FIG. 9 is an exploded view of a fixture and seal ring utilized with the gang tool of the present invention.

DESCRIPTION OF THE PREFERRED EMBODIMENT

Figure 1:
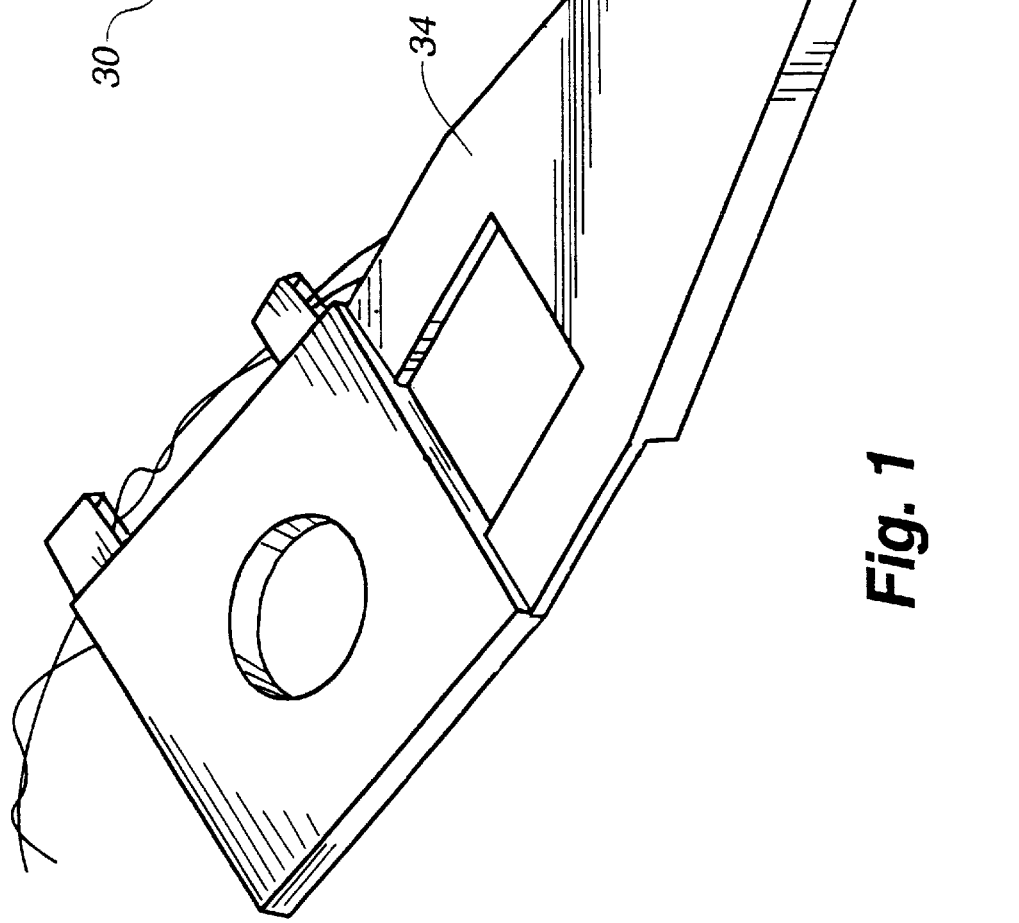
FIG. 1 is a perspective view of a magnetic read/write head attached to an arm of a disk drive, illustrating the air bearing profile, including rails, on the read/write head.

Referring first to FIG. 1, a magnetic read/write head 30, or slider, of the type having an air bearing surface 32 produced by PDR processing and machining, is shown mounted on an end of an arm 34. The profiled air bearing surface 32 is required to create an air bearing between the slider 30 and the spinning disk medium (not shown), as is commonly known.

Figure 2:
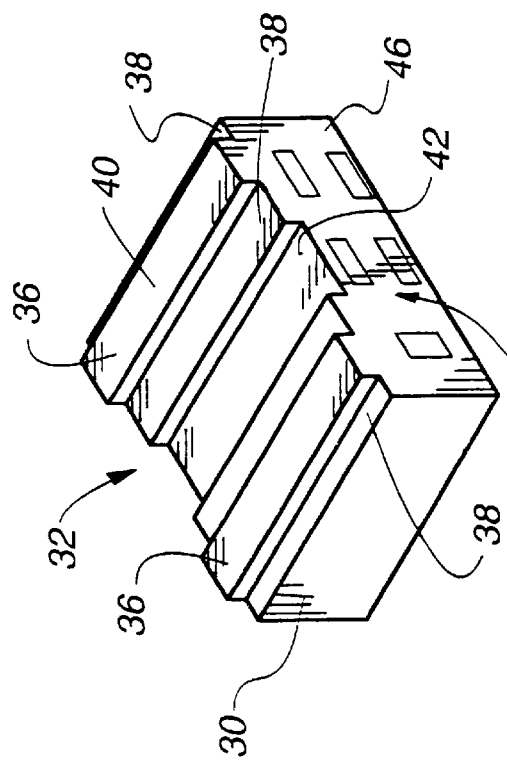
FIG. 2 is an enlarged perspective view of the read/write head as shown in FIG. 1, and illustrates the profile partially defined by plasma defined rail (PDR) processing and machining.

Referring to FIG. 2, the air bearing surface is shown in more detail, and includes a pair of rails 36, shoulders 38 formed on either side of the rail and offset below a top surface 40 of the rail, and a center trench 42. Coil circuitry 44 for use in reading and writing data to the recording medium (not shown) are formed on a front face 46 of the slider.

Figure 3:
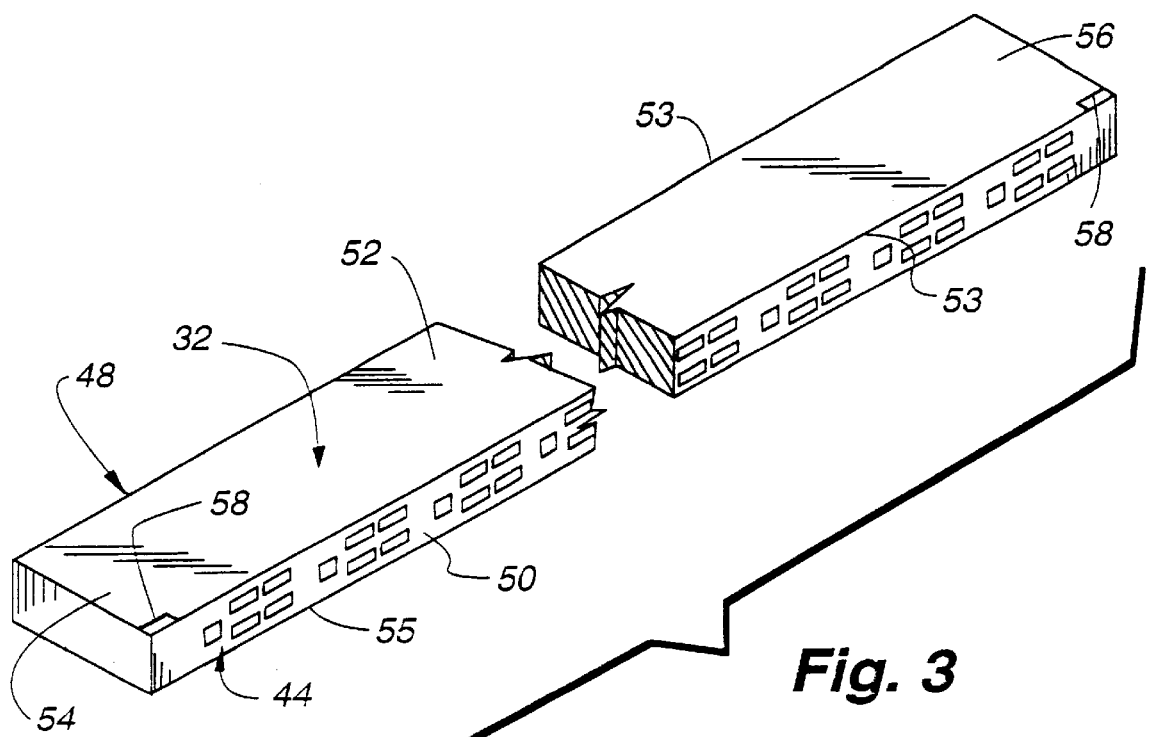
FIG. 3 is an enlarged partial perspective view of a row, illustrating the plurality of coil circuitry on a front face, and alignment marks on a top face.

In producing the slider 30, a plurality of individual coil circuitry 44 are formed on a top surface of a puck (not shown) in an ordered array of rows and columns. The puck is sawed into rows 48, each row containing a plurality of coil circuitry 44, as best seen in FIG. 3. Each coil circuitry 44 in the row 48 has a corresponding air bearing surface formed on an adjacent side during processing, in part by the PDR process, and becomes a slider 30. For orientation purposes in this detailed description, each row 48 has a front surface 50 upon which the plurality of coil circuitry 44 is positioned, and a top surface 52 which is processed into the air bearing surface 32, and a bottom surface 55. Each elongated row 48 also defines opposing longitudinal sides 53, a first 54 and second 56 opposing end, and an alignment mark 58 on the top surface 52 of the row 48 adjacent to each of the first 54 and second 56 opposing ends. The rows 48 are comprised of titanium carbide aluminum oxide. Each row 48 includes a plurality of coil circuitry 44 along the length of the front surface 50, preferably 28 twenty-eight.

To manufacture a slider 30 from the row 48, the top surface 50 of the row 48 must be processed to define the desired air bearing surface 32 corresponding with each coil circuitry 44, and each set of coil circuitry and associated air bearing surface 32 must be separated from one another to form the individual slider 30. In order to avoid the inefficiencies related to individually processing each row 48, the gang tool 60 (FIG. 6) of the present invention was developed to allow batch processing of a plurality of rows 48 at once.

Figure 4:
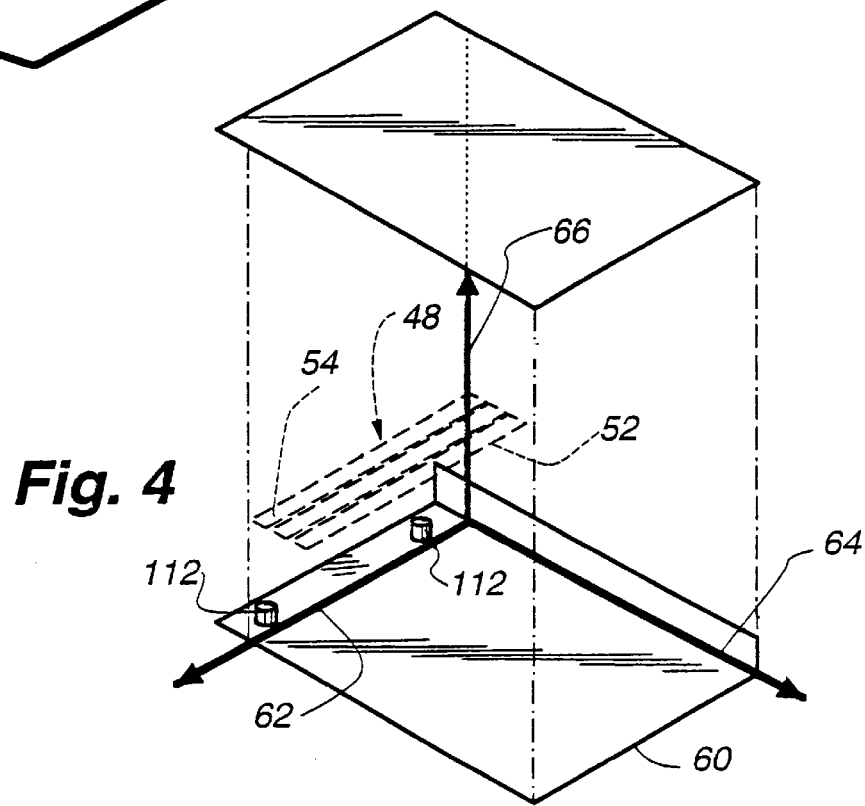
FIG. 4 is a schematic view of the gang tool of the present invention illustrating X, Y and Z coordinate references.

Batch processing the rows 48 through the PDR and machining process requires that the rows 48 be precisely aligned with respect to one another in the X 62, Y 64 and Z 66 axes, as shown in FIG. 4. The X-axis is oriented along the width of the main body member, the Y-axis is oriented along the length of the main body member, and the Z-axis is oriented along the thickness of the main body member.

The rows 48 must be positioned adjacent to one another along their length such that the plurality of coil circuitry 44 (FIG. 3) on the front surface 50 of each of the rows 48 are coextensive with and precisely aligned to the coil circuitry 44 in each of the adjacent rows 48. This satisfies the X-axis 62 alignment requirement. Further, it is important that the rows 48 be positioned such that the coil circuitry 44 coextensive with each other between adjacent rows 44 are aligned at a right angle to the length of the row 48 for proper air bearing alignment on the slider 30. This satisfies the Y-axis 64 alignment requirement. The top surface 52 of each row 48 must be substantially flush with the top surface 52 of each of the other rows 48 in the batch, so that the top surfaces 52 reside in substantially the same plane, satisfying the Z-axis 66 alignment requirement.

The precise positioning of the plurality of rows 48 is required for several steps in the PDR and machining processes, and as such, the gang tool 60 must be designed so as to be easily utilized in each of the processing steps, as well as provide a platform for handling the rows safely between processing steps without a large risk of damage. The PDR process utilizes photolithography and etch processes, well known in the industry, to define the tightly-toleranced air bearing surfaces. The machining process utilizes a grinder or saw, as is known in the art.

Figure 5:
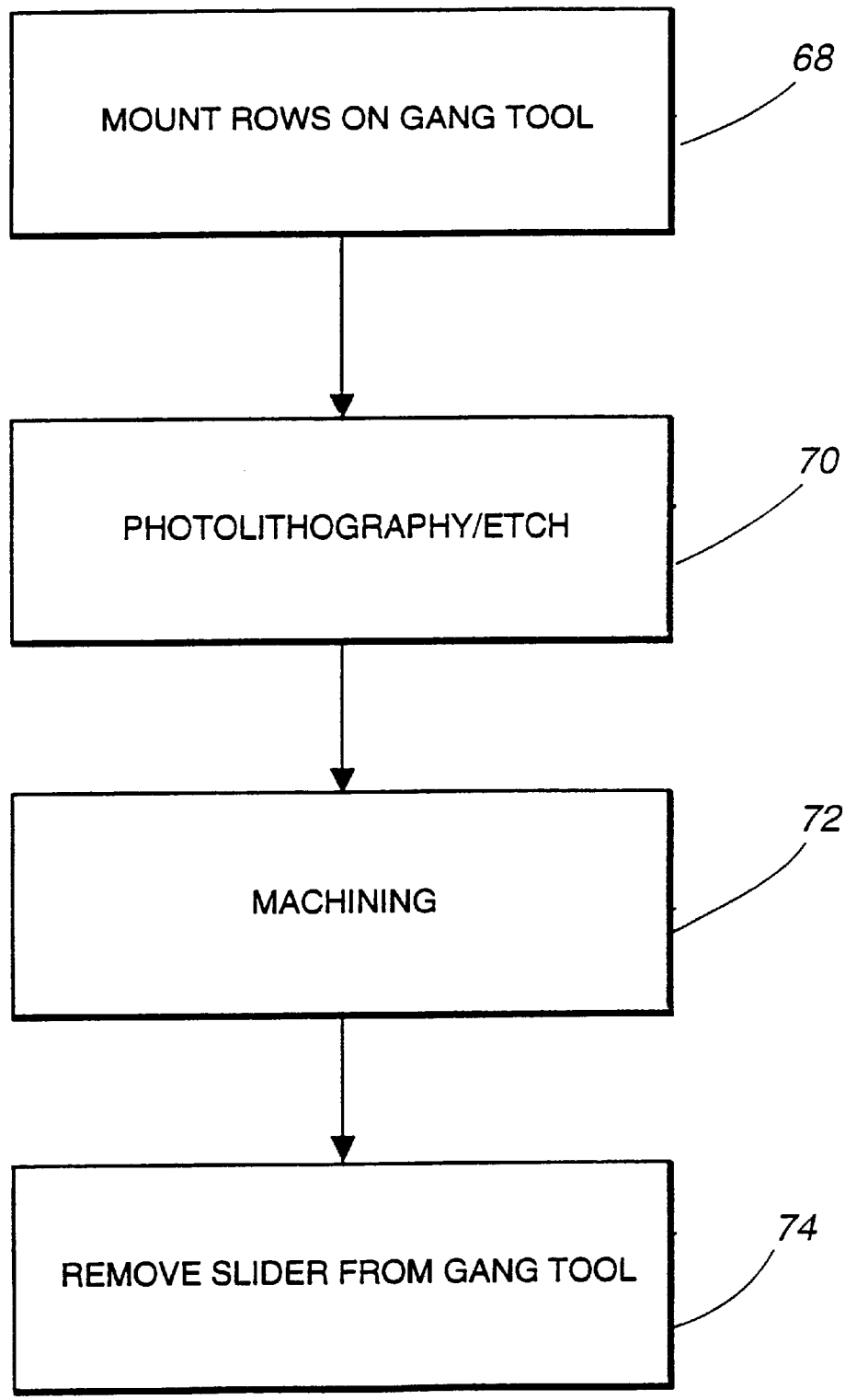
FIG. 5 is a flow chart of the manufacturing process in which the tool of the present invention is utilized.

In general, FIG. 5 shows the summary operations in using the gang tool 60 in batch processing rows 48 through the PDR process. Box 68 indicates the mounting of rows 48 on the gang tool 60, as is briefly described above and more completely described below. Next, the rows 48 are processed through the photolithography and etch processes, utilized by the PDR process, to partially define the air bearing surface 32, as indicated by Box 70. The air bearing surface 32 is then further defined, and the rows are separated into individual sliders, by machining, as indicated by Box 72. Finally, the individual sliders 30 are removed from the gang tool 60, as indicated by Box 74.

Referring to FIGS. 6 and 7, the gang tool 60 of the present invention comprises a rectangular main body member 76 having a top surface 78, a bottom surface 80, together forming a thickness, a first 82 and second 83 longitudinally opposing ends defining a length, and two laterally opposing sides 84, defining a width. Positioned between the opposing sides 84 is a centrally located platform structure 86. First 88 and second 90 positioning surfaces are formed in the top surface 78 of the gang tool 60, and extend along the lateral sides 84 of the tool 60 between the opposing ends 82. The first positioning surface 88 defines a threaded aperture 92 for receiving a threaded fastener 94, as described below. The second positioning surface 90 defines a plurality of threaded apertures 96, 98 each for receiving a threaded fastener 94 as further described below.

Continuing with FIG. 7, the main body 76 member of the gang tool 60 defines a lower portion 100 adjacent to the bottom surface 80, the lower portion 100 having an outer surface 102 that slants upwardly and inwardly along the perimeter 104 of the main body member 76. The upwardly and inwardly sloping lower portion 100 of the main body member 76 is specially shaped for being received in complimentary shaped receptacles (not shown) as necessary for securely holding the gang tool 60 during various processing steps.

Figure 15:
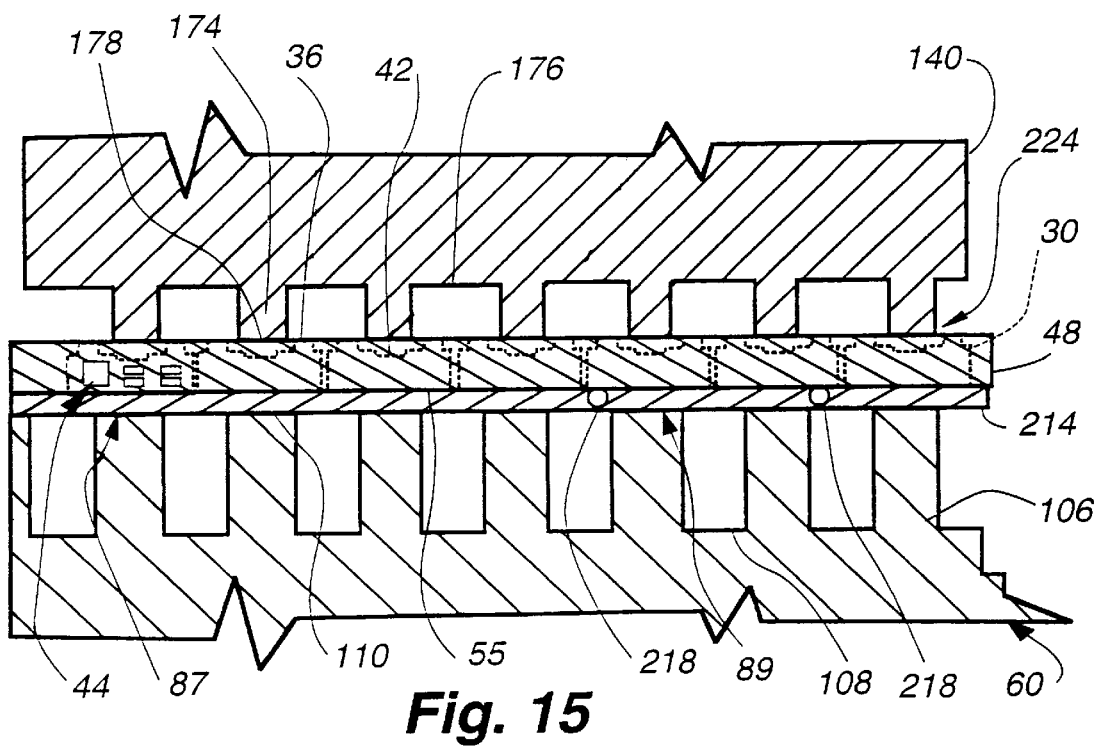
FIG. 15 is an enlarged representative section of the present invention as shown in FIG. 17.
Figure 16:
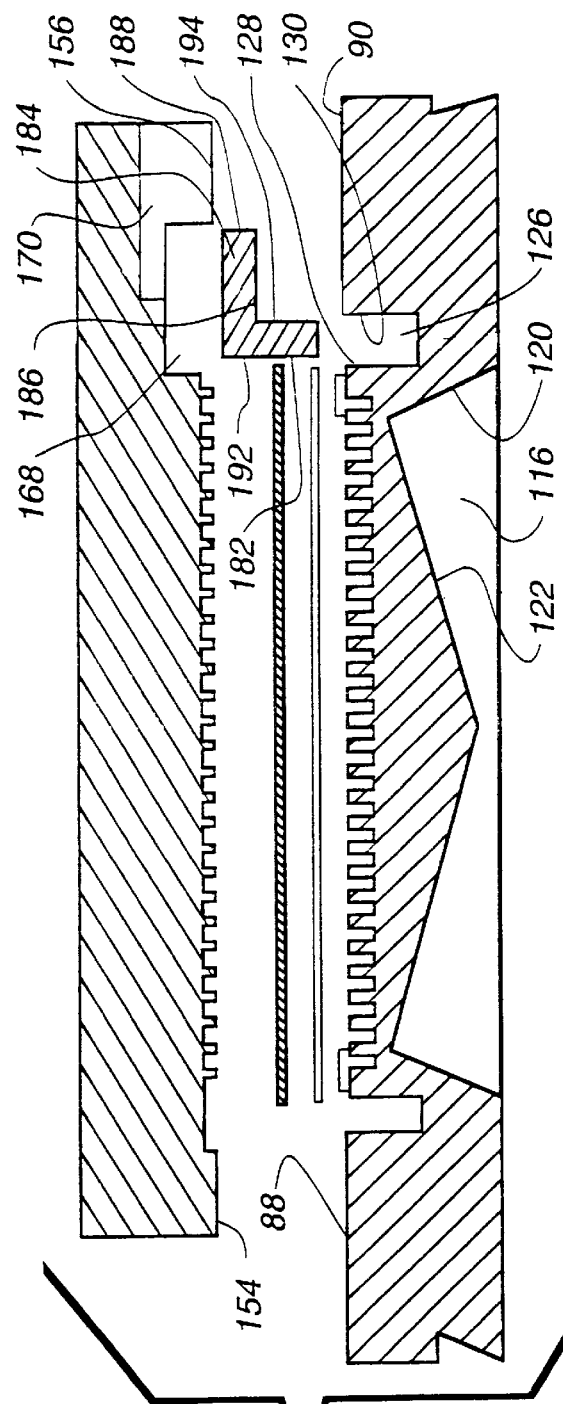
FIG. 16 is a representational exploded section view of the gang tool of the present invention illustrating the gang tool, an adhesive sheet, a row of read/write heads, a lateral positioning fence, and a top plate.

Still referring to FIG. 6, the central platform 86 of the gang tool 60 generally defines a planar upper surface 87, which in turn defines an upwardly facing z-axis base surface 89. More specifically, a plurality of parallel beams 106 oriented lengthwise on the gang tool 60 that extend between the opposing ends 82. The beams 106 extend across the width of the platform 86 between the first 88 and second 90 positioning surfaces. The beams 106 are spaced by grooves 108 positioned between adjacent beams across the width of the platform. The beams are continuous along their length, extend upwardly to define substantially flat top ends 110, and are substantially rectangular in cross-section (FIG. 15). The top ends 110 of all of the beams 106 lie in a single plane across the width and length of the platform 86.

Continuing with FIG. 6, a pair of Y-axis reference pins 112 are positioned on the platform at the first end 82 of the gang tool 60, and form the upper end 114 of the platform 86. The Y-axis reference pins 112 preferably have a solid cylindrical shape defining engagement surfaces 113, and extend slightly above the top ends 110 of the beams 106. The Y-axis reference pins 112 are positioned on the platform 86 so that when a row 48 is positioned on the platform 86 to engage the Y-axis reference pins, the row 48 is oriented perpendicularly to the length dimension of the beams 106 and grooves 108. The Y-axis reference pins form an anchor by which to orient the rows 48 in the Y-axis 64 direction when they are placed on the platform. The row 48 positioned in engagement with the Y-axis reference pins is termed the "anchor" row.

The rows 48 are positioned on the top ends 110 of the platform 86 with the appropriate X 62, Y 64, and Z-axis 66 orientation and positioning required for the PDR and machining processing. FIG. 4 shows that the X-axis 62 is oriented across the width of the gang tool, in a line between the opposing sides 84, the Y-axis 64 is oriented along the length of the gang tool 60, and the Z-axis 66 is oriented through the main body member 76 of the gang tool 60, into and out of the top 78 and bottom 80 surfaces in a direction perpendicular to the X 62 and Y 64 axes.

Referring to FIG. 7, a cavity 116 is shown defined in the bottom surface 80 of the gang tool 60. The cavity 116 is centrally located on the bottom surface 80 of the gang tool 60 and is positioned coextensive with the platform 86. The cavity 116 is utilized for efficiently heating and cooling the platform 86 as will be described below. The cavity 116 defines a pair of longitudinally opposing end walls 118, a pair of laterally opposing sidewalls 120, and a back wall 122. The sidewalls 120 slope upwardly and outwardly at an angle from the back wall 122, while the end walls 118 extend substantially vertically from the back wall 122. The back wall 122 defines a crest 124 extending longitudinally between the end walls 118 along the longitudinal axis of the cavity 116. From the crest 124, the back wall 122 slopes downwardly and outwardly towards the intersection with the side walls 120. The cavity 116 thus defines a laterally oriented and longitudinally extending M-shape. The shape of the cavity 116 is specifically designed to provide uniform heat distribution and cooling capacity as desired.

A longitudinal recess 126, as shown in FIGS. 6, 12, 13 and 16, extends along the length of the gang tool 60 between the second positioning surface 90 and the edge 128 of the platform 86. The outer wall 130 of the recess 126 extends downwardly from the second contact surface 90 to the bottom 132 of the recess 126, and defines an X-axis alignment surface. The X-axis alignment surface is parallel to the beams 106 in the platform 86.

Figure 14:
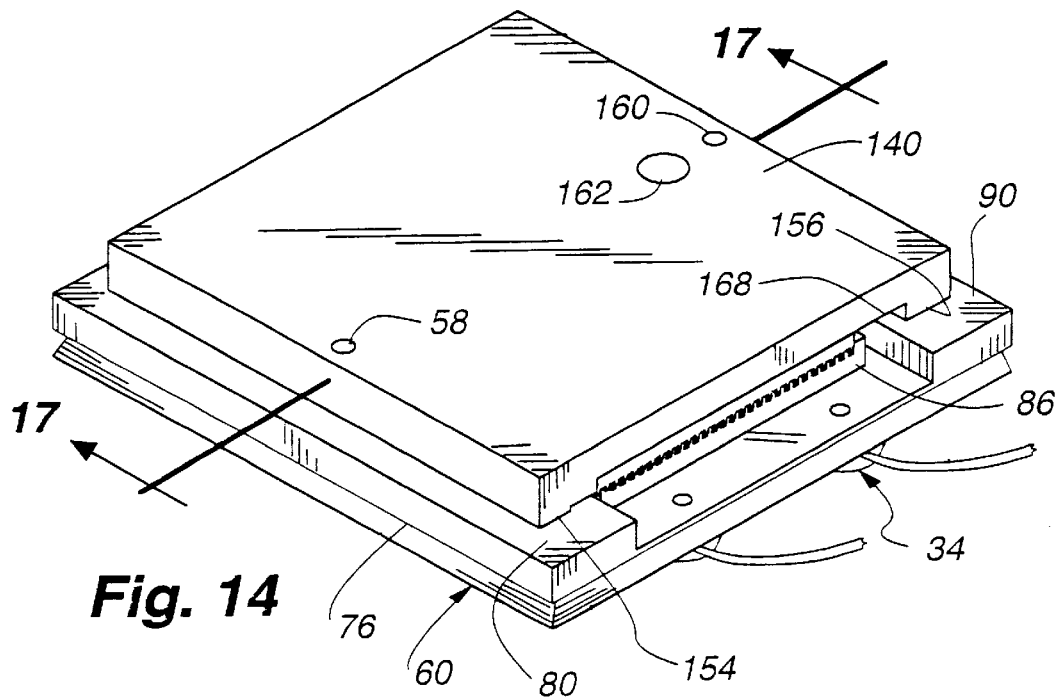
FIG. 14 is a perspective view of the gang tool of the present invention, and illustrates the gang tool with the top plate mounted thereon.
Figure 17:
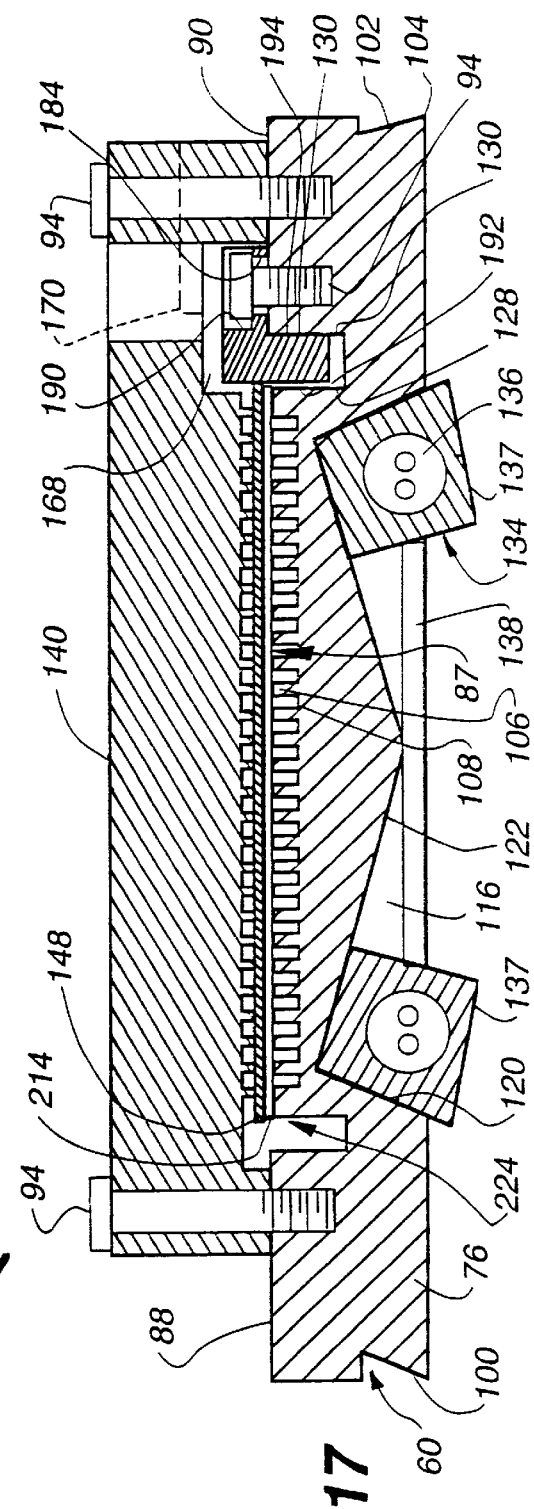
FIG. 17 is a section taken along line 17—17 of FIG. 14.

FIG. 8 shows a resistive heating element 134 utilized to heat the platform 86 during the bonding operation. The resistive heater 134 is designed to fit into the cavity 116 to efficiently and safely heat the platform 86 as will be described further below. The resistive heater element 134 comprises a pair of elongated cylindrical heating elements 136 spaced apart by a pair of cross members 138 extending between the cylindrical elements 136. Each heating element 136 is encased in a heat conductive cover 137. Each cover 137 has a shape matching the portion of the cavity that it contacts. The heating elements 136 are spaced apart by a specific dimension so that each cover 137 each contacts both the side wall 120 and the back wall 122 along each longitudinal side of the cavity 116 during use. The resistive heater 134 is activated and controlled in any known manner. The resistive heater 134, while represented here as an independent structure, can also be built into a fixture (not shown) upon which the gang tool is placed during the bonding operation. In either embodiment, the heating elements 136 engage the cavity 116 as shown in FIGS. 14 and 17.

Figure 10:
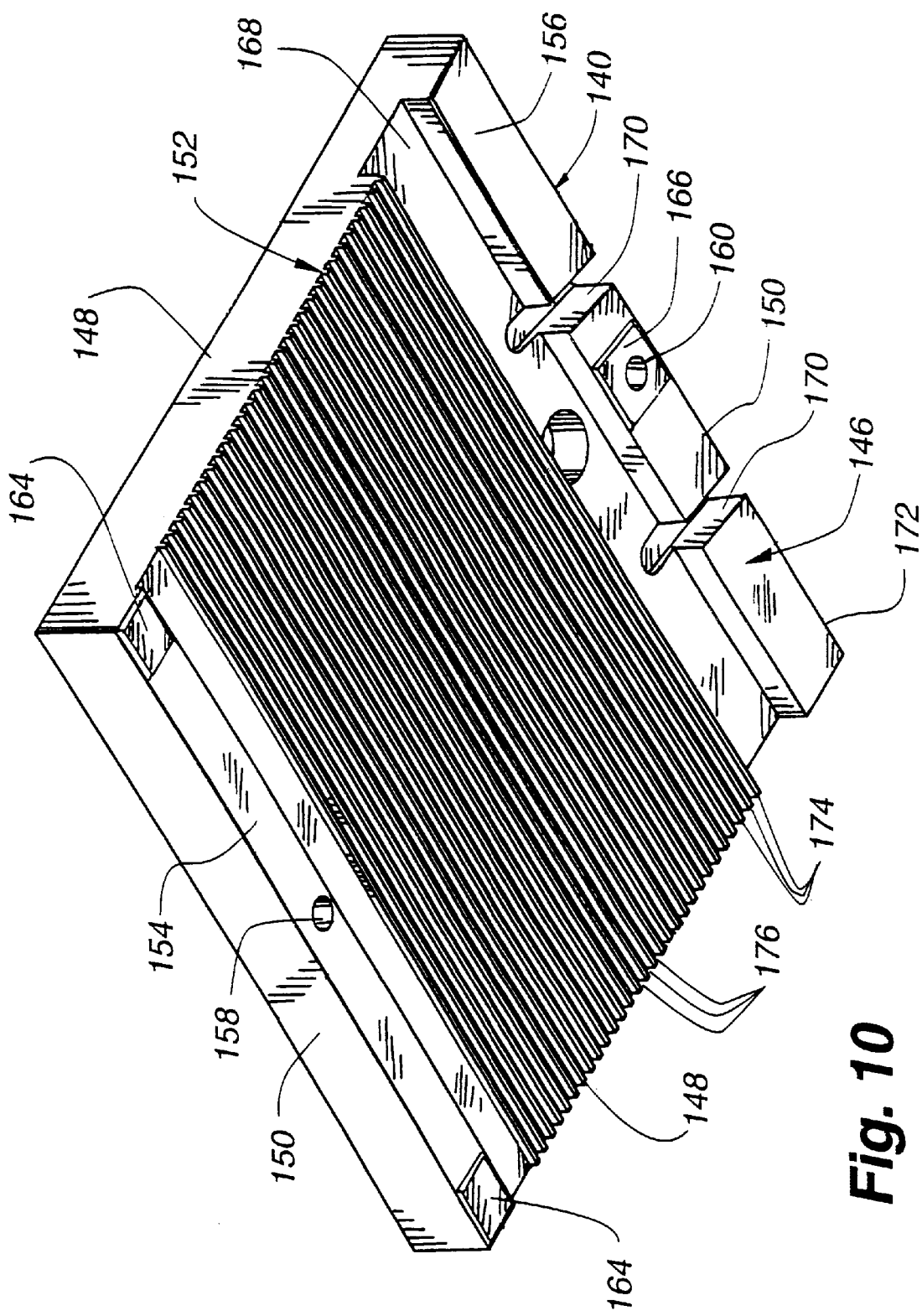
FIG. 10 is an enlarged perspective view of the top plate, illustrating the Z reference surface and a pair of grooves.

Referring to FIGS. 6 and 10, a top plate 140 is disclosed. The top plate 140 is used in aligning the top surfaces 52 of the rows 48 after being mounted on the platform 86, as is described hereinafter. The top plate 140 is shaped similarly to the gang tool 60 in that it comprises a rectangular main body member 142 having a top surface 144, a bottom surface 146, two longitudinally opposing ends 148, and two laterally opposing sides 150. Positioned between the opposing sides 150 is a centrally located Z-axis 66 reference surface 152.

Referring to FIG. 10, first 154 and second 156 positioning surfaces are formed on the bottom surface 146 of the top plate 140, and extend along the lateral sides 150 of the top plate 140 between the opposing ends 148. The first positioning surface 154 defines a threaded aperture 158 for receiving a threaded fastener 94, as described below. The second positioning surface 156 defines a threaded aperture 160 for receiving a threaded fastener 94 as further described below, and a bore 162. The first positioning surface 154 defines spacing tabs 164 adjacent to either end 148, and the second positioning surface 156 defines a tab 166 located centrally along the length of the second positioning surface 156. Each tab 164, 166 has a predetermined thickness dimension. An elongated recess 168 is formed along the length of the top plate 140, and is positioned between the second positioning surface 156 and the Z-axis reference surface 152. First and second slots 170 are defined in the second positioning surface 156, and each extend from the recess 168 through the outer edge 172 of the top plate 140.

Referring to FIG. 10, the Z-axis reference surface 152 of the top plate 140 comprises a plurality of parallel beams 174 oriented lengthwise on the top plate 140 that extend between the opposing ends 148. The beams 174 extend across the width of the Z-axis reference surface 152 between the first 154 and second 156 alignment surfaces. The beams 174 are spaced by grooves 176 positioned between adjacent beams 174 across the width of the Z-axis reference surface 152. The beams 174 are continuous along their length, extend downwardly to define substantially flat bottom ends 178, and are substantially rectangular in cross-section (FIG. 15). The bottom ends 178 of each of the beams 174 lie in a single plane across the width and length of the Z-axis reference surface 152.

An elongated fence member 180 having an L-shaped cross-section is shown in FIGS. 6, 13, 16, 17 and 19. The fence member 180 defines a downwardly depending leg 182, and a laterally extending leg 184, the legs being integrally formed together at a right angle. The laterally extending leg 184 defines a bottom surface 186, an outwardly facing engagement surface 188 and a slotted aperture 190 formed through the leg 184 for receiving a fastener 94. The downwardly depending leg 182 defines an abutment surface 192 and an outer alignment surface 194 parallel to each other. The fence 180 member is substantially the same length as the platform 86.

The downwardly depending leg 182 of the fence member 180 is removably received in the recess 126 on the gang tool 60, and the outer alignment surface 194 is caused to engage the X-axis alignment surface 130. The laterally extending leg 184 engages the second positioning surface 90, and a fastener 94, such as a screw, is received in the aligned apertures 190, 98 in the leg 184 and second contact surface 90 to releasably attach the fence 180 to the gang tool 60 with the outer alignment surface 194 of the fence 180 in engagement with the X-axis alignment surface 130. Since the outer alignment surface 194 and the abutment surface 192 are parallel to one another, and the outer alignment surface 194 and the X-axis alignment surface 130 are in complete contact with one another, the X-axis alignment surface 130 is functionally represented at a position closer to the platform 86 by the abutment surface 192, as shown in FIG. 17.

FIG. 9 illustrates a fixture 196 and seal 198 for use in cooling the gang tool 60 during the etch step of the PDR process, as is described further below. A first surface 200 of the fixture defines a protrusion 202 having a mirror image of the shape of the cavity 116. The protrusion 202, however, is dimensioned just smaller than the cavity 116. The fixture 196 defines a flange 204 extending around the perimeter 206 of the protrusion 202.

Figure 20:
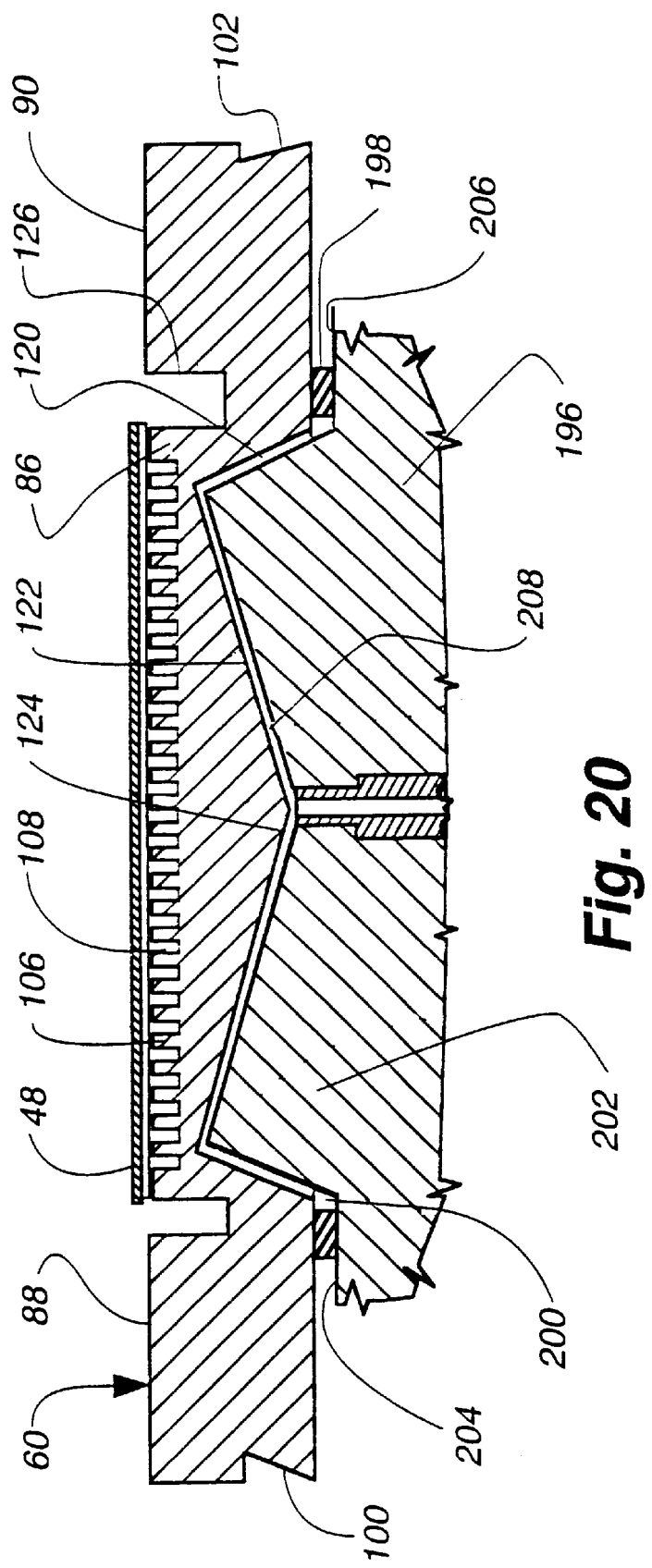
FIG. 20 is a representative section view of the gang tool of the present invention, illustrating the back plate and seal ring positioned in the cavity formed on the back of the gang tool.

The protrusion 202 very nearly mates with the walls 118, 120, 122 of the cavity 116, as shown in FIG. 20, when the gang tool 60 is mounted over the fixture 196, and the protrusion is received within the cavity 116. The continuous seal member 198 is positioned between the flange 204 on the fixture 196 and the bottom surface 80 of the gang tool 60 around the cavity 116 forming an impermeable seal.

The seal 198 also provides the appropriate dimensioning such that when the gang tool 60 is mounted on the fixture 196, the protrusion 202 fits into the cavity 116 and the gap 208 between the protrusion 202 and the walls 118, 120, 122 of the cavity 116 is formed. The gap 208 is dimensioned to be less than the mean-free path of helium, which is used as a coolant during the etch process.

The functional features, as well as other structural details, of the gang tool 60 are described in detail below. Briefly, however, in use, the rows 48 are properly oriented on the gang tool by: positioning the rows 48 on the platform 86 with one end 56 abutted against the X-axis alignment surface 130 represented by the abutment surface 192 of the fence 180. The rows 48 are also aligned against the Y-axis reference pins 112. The rows 48 are then in the correct orientation with respect the platform 86 in the X 62 and Y 64 axis directions. The top plate 140 is then positioned over the gang tool 60 such that the tabs 164 and 166 on the positioning surfaces 154 and 156 of the top plate 140 engage the first and second positioning surfaces 88 and 90 on the gang tool, respectively. The bottom ends 178 of the beams 174 on the top plate 140 engage the top surface 52 of the rows 48 to position the top surfaces 52 of the rows 48 in a single plane. The bottom ends 178 of the beams 174 on the top plate 140 are spaced away from the top ends 110 of the beams 106 on the gang tool 60 a predetermined distance specifically for this purpose, as is further described below.

Figure 11:
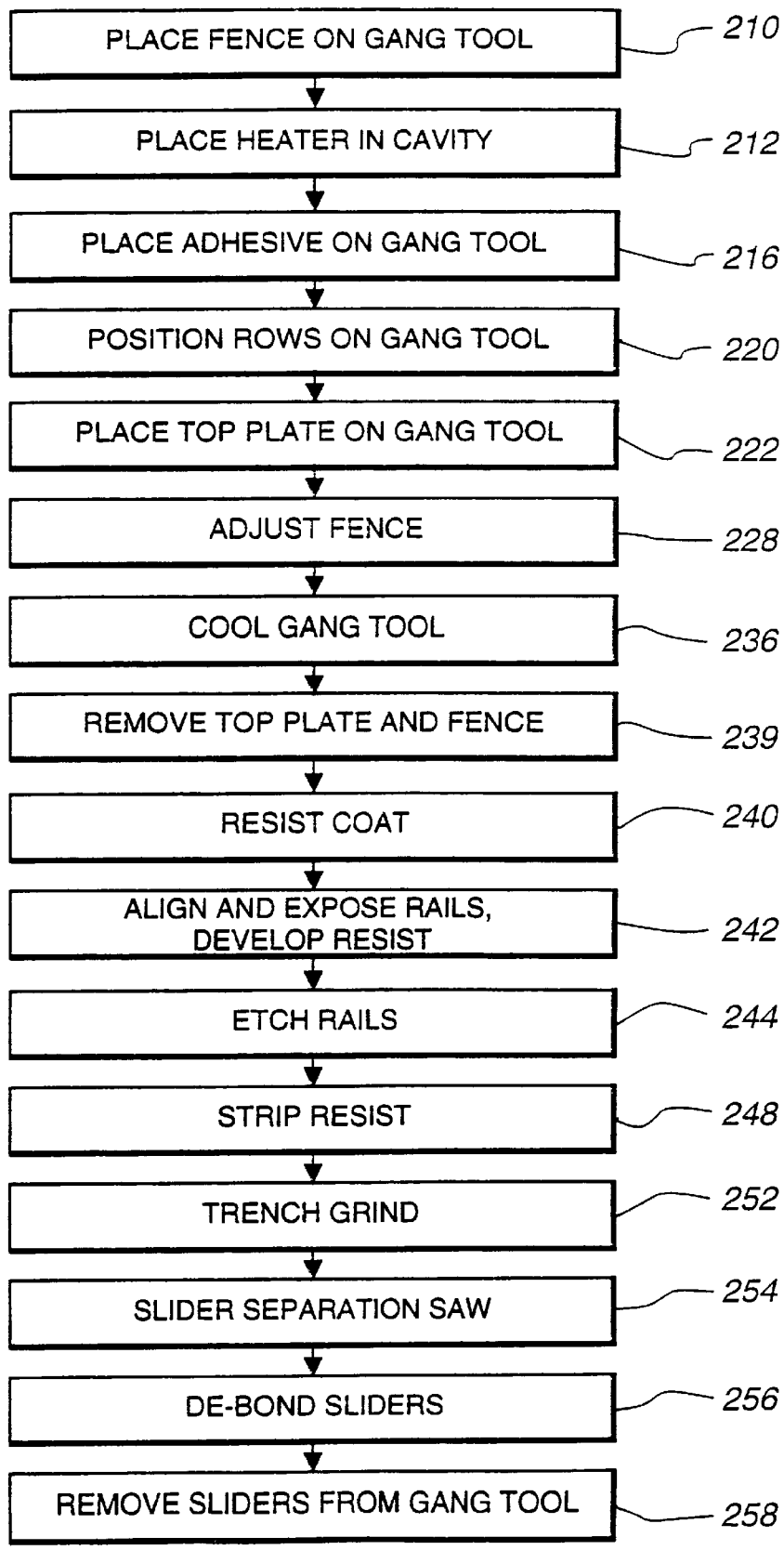
FIG. 11 is a more detailed flowchart of the process in which the tool of the present invention is utilized.

The method of using the gang tool 60 to batch process the rows during the definition of the air bearing surface 32 is shown in FIG. 11, and is further described below.

First, as indicated by 210 in FIG. 11, the fence member 180 is positioned on the gang tool 60 as described above, with the outer alignment surface 194 engaging the X-axis alignment surface 130. The fence member 180 is then attached to the gang tool 60 by use of the releasable fasteners 94 positioned through the slotted aperture 190 and into aperture 96. The fence member 180 provides the abutment surface 192 for alignment of the rows 48 in the X-dimension on the platform 86. See FIG. 17. The gang tool is positioned on the resistive heater 134 so that the heater is then positioned within the cavity on the bottom surface 80 of the gang tool 60, as described above, and is activated to heat the platform 86 in an efficient and isolated manner so as to not affect the operator. The specially designed cavity 116 shape insures an even heat distribution to the platform. See step 212 in FIG. 11, and FIGS. 14 and 17.

Figure 12:
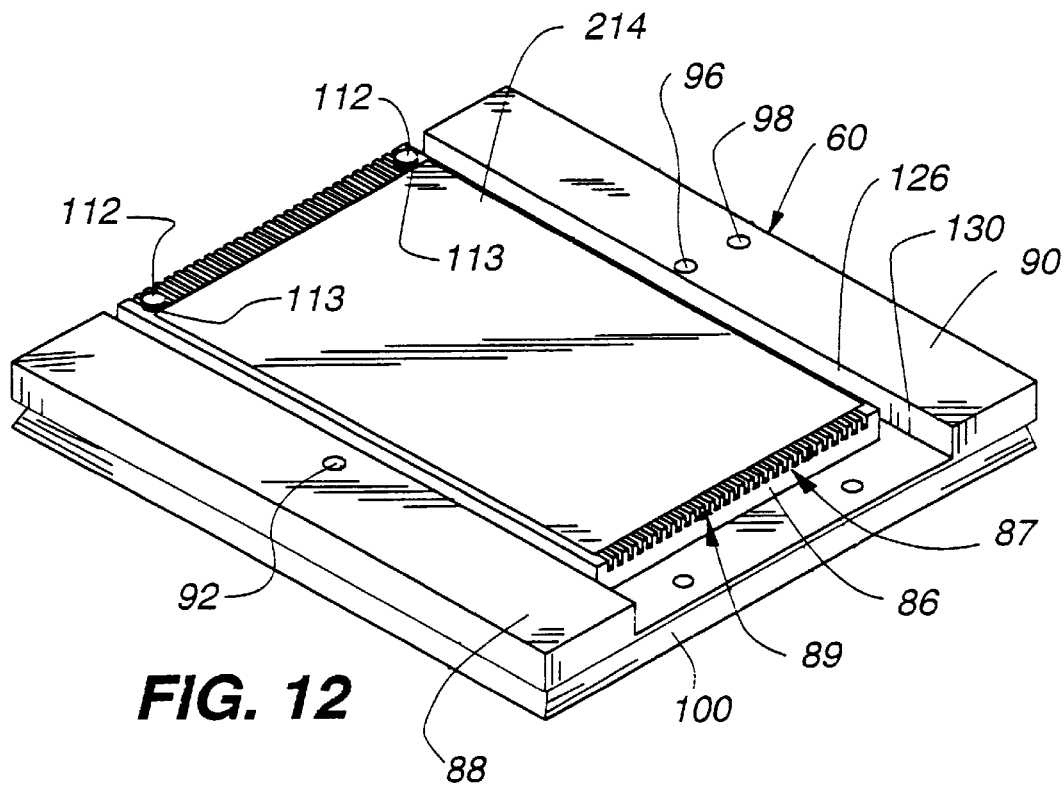
FIG. 12 is a perspective view of the gang tool of the present invention, illustrating a sheet of adhesive positioned on a top surface of the gang tool.

A sheet of adhesive 214 is then placed on the platform 86 of the gang tool 60, as is indicated by step 216 in FIG. 11, and shown in FIG. 12. The sheet adhesive 214 is a hot-melt adhesive which has an adhesive viscosity which is easily controlled by the resistive heater 134 to allow easy movement of the rows 48 for accurate positioning. The hot melt adhesive 214 is precut sheet of a predetermined dimension to fit on the platform 86, and which includes beads 218 of a certain size interspersed throughout the adhesive 214, as is described below. The combination of the shape of the cavity 116 on the bottom surface 80 of gang tool 60 along with the resistive heater 134 provides an even heat distribution across the platform 86 so that the adhesive 214 melts consistently and the adhesive viscosity can be closely controlled.

Figure 13:
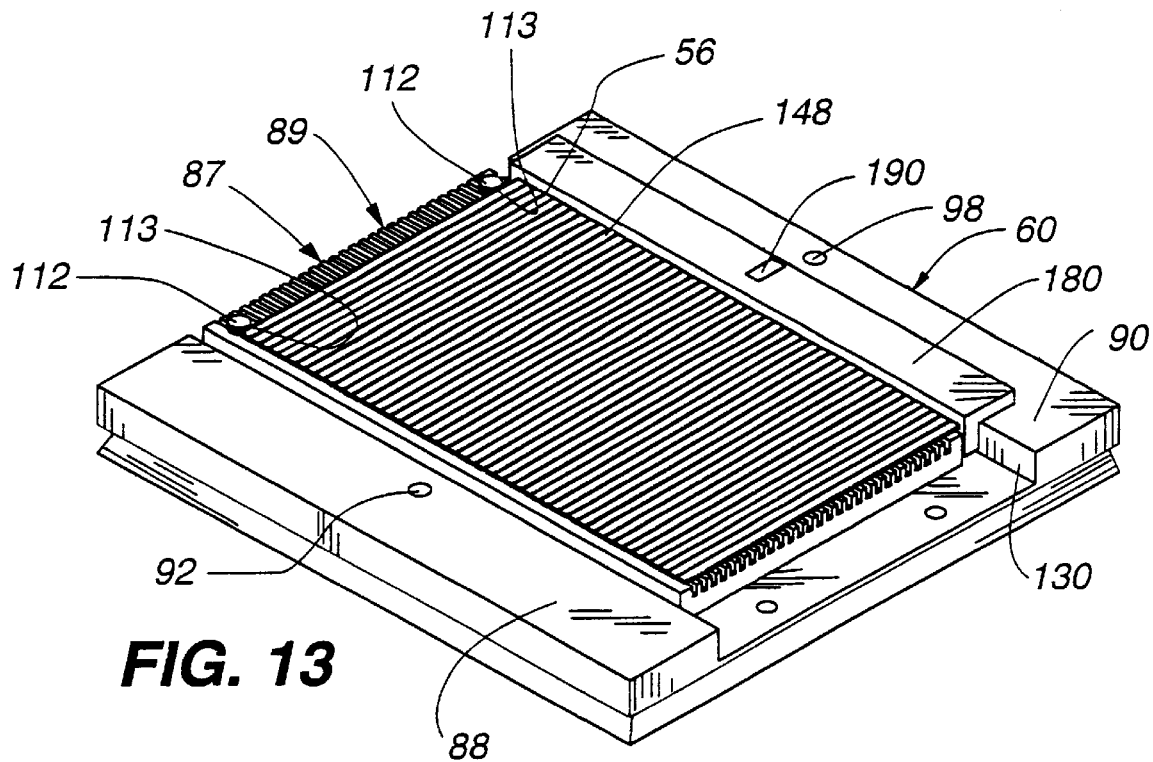
FIG. 13 is a perspective view of the gang tool of the present invention, illustrating a plurality of rows, each including a plurality of read/write heads, positioned on a top surface of the gang tool.

The rows 48 are then placed manually on the adhesive 214, as indicated by step 220, and shown in FIGS. 13 and 20. A first row is positioned at the top end 82 of the platform 86 in contact with the Y reference pins 112, such that the opposite ends of the first row 48 engage the Y reference pins 112 to establish the proper Y position. The first row 48 is then slid towards the abutment surface 192 on the fence 180 until the end 56 of the row 48 contacts the abutment surface 192. This positions the row 48 in the appropriate X-direction orientation. The other rows 48 are positioned on the platform 86 in a similar manner, with each successive row 48 being positioned against the previous row to establish the correct Y-axis positioning. Each row 48 is then moved in the X-axis to contact the abutment surface 192 to establish the correct X-axis positioning.

In this manner, each of the plurality of coil circuitry 44 on each row 48 are positioned with respect to the corresponding coil circuitry 44 in each adjacent row 48. The coil circuitry 44 then form precisely spaced parallel columns oriented longitudinally of the gang tool 60 between adjacent rows 48. The formation of these parallel columns is critical to subsequent processing.

Figure 25:
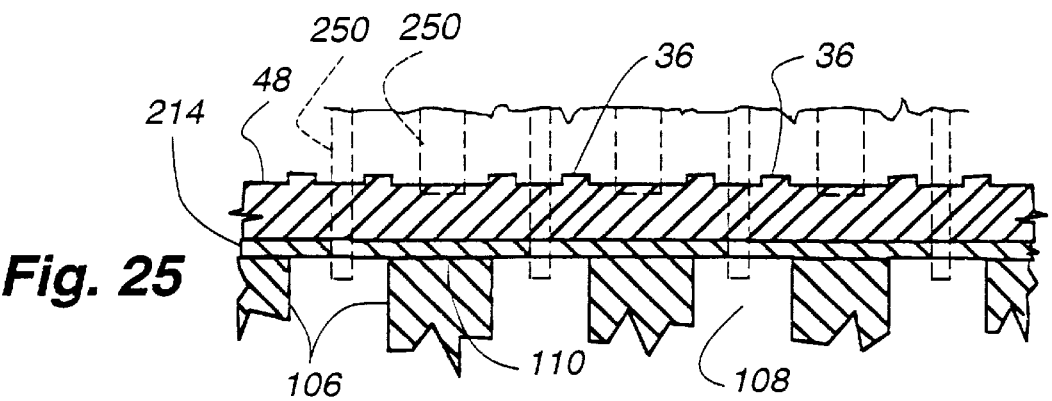
FIG. 25 is a partial representative section of the gang tool of the present invention, and illustrates the positioning of saw and trench cuts machined on the rows after the etch step of the PDR process.

The spacing of the beams 106 on the platform 86 of the gang tool 60 is also critical, and is indicated in FIGS. 15 and 25. The beams 106 are spaced across the surface of the platform 86 such that when the rows 48 are positioned on the top ends 110 of the beams 106 and engage the abutment surface 192 in the final X-axis position (FIG. 19), the top ends 110 of the beams 106 are located directly below every coil circuitry 44 in the row 48. The grooves 108 between the beams 106 are thus located directly below the space between each consecutive coil circuitry 44 on a row 48.

During the row placement operation, the adhesive 214 is maintained at a particular temperature such that its viscosity is adequate to attach the row 48 to the platform 86, without interfering with the slight movement necessary to correctly position the row 48 against the adjacent rows 48 and the abutment surface 192. Preferably, forty rows are bonded to the platform 86 of the gang tool 60 to allow processing of the rows 48 through the PDR and machining processes at the same time.

The top plate 140 is then positioned over and lowered onto the gang tool 60, as seen in step 222 of FIG. 11, and in FIGS. 14 and 17. The top plate 140 is lowered so that the pads on the top plate 140 contact the first 88 and second 90 positioning surfaces on the gang tool 60, respectively, correctly positioning the bottom 178 of the beams 174 on the top plate 140 over the rows 48. The bottom end 178 of the beams 174 of the top plate 140 engage the top surface 52 of the rows 48, and causes the top surface 52 of each of the rows 48 to be flush and positioned in a single plane, as earlier described. Since the rows 48 sit on the adhesive, there is some adjustment available.

The beams 174 of the top plate 140 are spaced apart by the grooves 176 such that the bottom end 178 of the beams 174 contact the top surface 52 of the rows 48 at locations between where the rails 36 are to be defined in subsequent processing, as shown in FIG. 15, so that no damage to the coil circuitry 44 can occur. The beams 174 run transverse to the placement of the rows 48, and thus gently force the rows 48 into the adhesive 214 as necessary to create the planar surface of the plurality of the rows 48.

The top plate 140 is properly oriented with respect to the gang tool 60 by the precisely dimensioned recess 168 formed in the top plate 140, which receives the fence 180.

The top plate 140 is releasably secured to the gang tool 60 by positioning the releasable fasteners 94 through the apertures 158 and 160 in the first 154 and second 156 positioning surfaces on the top plate 140, and being received by the corresponding apertures 92 and 98 formed in the first 88 and second 90 positioning surfaces of the gang tool 60. As such, when the top plate 140 is positioned on the gang tool 60 and fastened down, the tabs 164, 166 on the first 154 and second 156 positioning surfaces of the top plate 140 fully engage the first 88 and second 90 positioning surfaces on the gang tool 60.

In this position, the dimension of the gap 224 between the bottom end 178 of the beams 174 on the top plate 140 and the top end 110 of the beams 106 on the gang tool 60 is crucial. The gap 224 is substantially equal to the diameter of the sizing beads 218 found in the adhesive sheet 214 plus the thickness of the row 48. When the bottom ends 178 of the beams 174 on the top plate 140 engage and press downwardly on the rows 48, the rows 48 can move in the downward direction until they contact the beads 218 in the adhesive 214, which then prohibit any further downward movement of the rows 48. Since the rows 48 are substantially the same thickness, the top surfaces 52 of the rows 48 are caused to be positioned in a flush manner between adjacent rows 48, and therefore the top surfaces 52 of all the rows 48 all lie in a single plane. This satisfies the Z-axis requirement.

While the top plate 140 is still mounted to the gang tool 60, the temperature of the heater 134 is increased to in turn increase the sheet adhesive 214 from a tacky consistency to a near liquid state. At this point, the fastener 94 that fixes the fence 180 to the gang tool 60 is loosened. An bore 162 in the top plate 140 provides access to the fastener 94. A fork structure 226 is then used to re-align the fence 180 to insure adequate contact with the rows 48 for proper X-axis positioning, as indicated by step 228.

Figure 18:
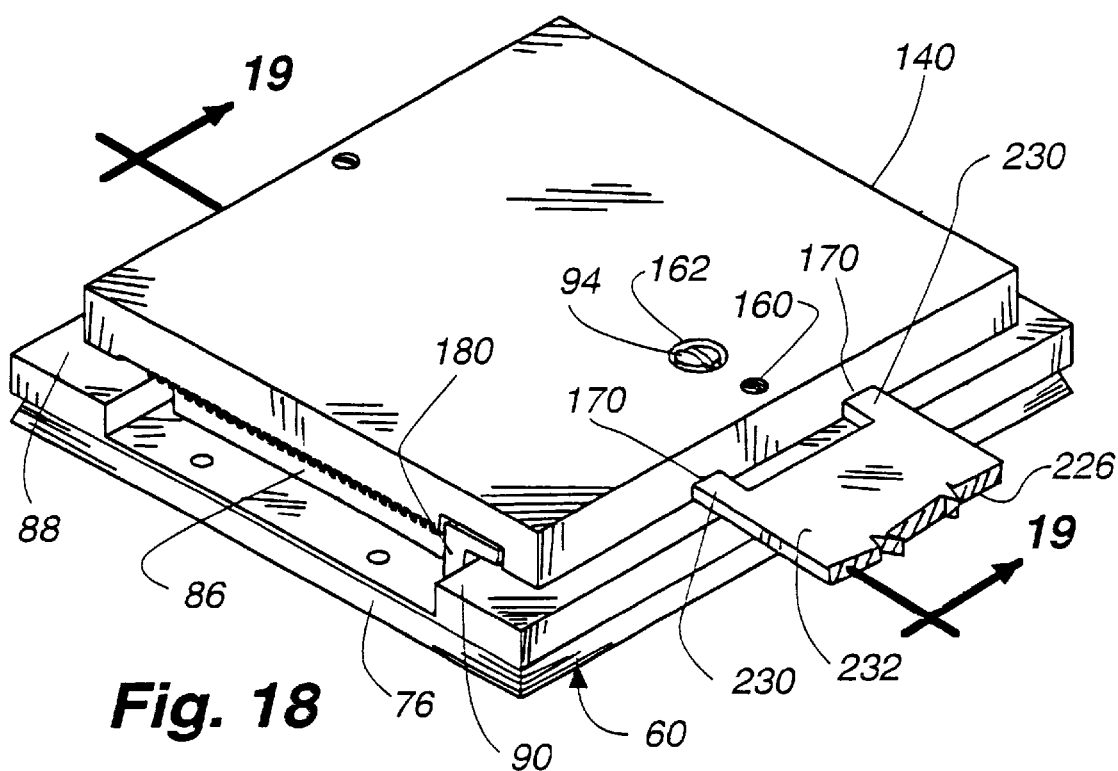
FIG. 18 is a perspective view of the gang tool of the present invention, and illustrates the gang tool with the top plate mounted thereon and a fork structure inserted through the slots to adjust the fence.
Figure 19:
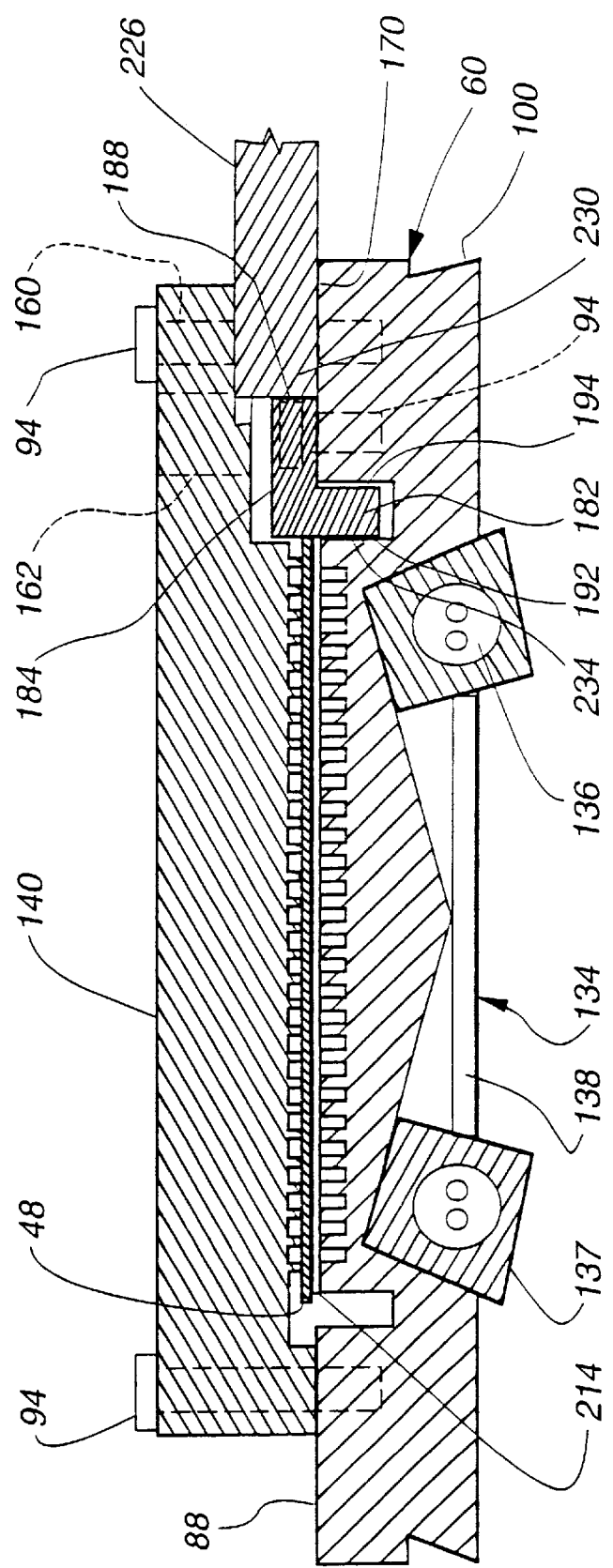
FIG. 19 is an enlarged section taken along line 19—19 of FIG. 20.

The fork structure 226, shown in FIGS. 18 and 19, comprises two parallel tines 230 extending from a base member 232. The tines 230 are spaced apart precisely the same distance as the slots 170 in the top plate 140. The tines 230 are shaped to exactly fit into the slots 170 to minimize any movement other than axial movement through the slots 170. The tines 230 are the same length so that when they are inserted through the slots 170, the tines 230 contact the outwardly facing surface 188 of the lateral leg 184 of the fence 180 at the same time. Further insertion of the tines 230 through the slots 170 causes the fence 180 to move toward the platform 86 and thus disengages the outer alignment surface 194 from the X-axis orientation surface 130. As the fence 180 moves towards the platform 86, the rows 48 that contact the abutment surface 192 are moved in the same direction. The fence 180 is moved toward the platform until the abutment surface 192 engages the outer edge 234 of the platform. This readjustment of the fence 180 is to compensate for any lateral movement of the rows 48 up to this point, and to place the rows 48 in the final position over the beams 106 (FIG. 15). The fence member 180 is then reattached to the gang tool 60 by tightening the fastener 94, and the tines 230 are removed from the slots 170.

Figure 21:
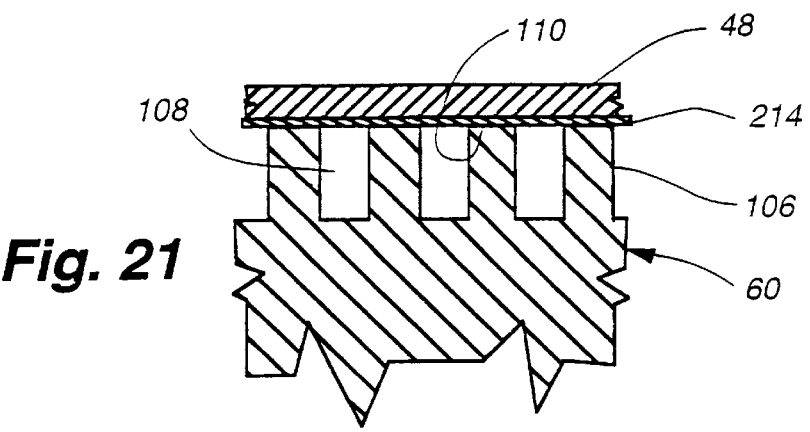
FIG. 21 is a representational partial section of the gang tool of the present invention, and illustrates an adhesive sheet positioned on top of a plurality of beams spaced apart by grooves, and a row positioned on top of the adhesive.

The gang tool 60 is removed from the heater 134 to disengage the heater covers 137 from the cavity, and the gang tool 60 with the top plate 140 still engaged is cooled, as indicated by step 236, from the bottom up, for instance by placing on a cooling plate (not shown). As the adhesive 214 cools from the bottom up, the rows 48 become fixed in the correct X 62, Y 64 and Z 66-axis positions for further processing. The top surfaces 52 of the rows 48 lie in a single plane, and the coil circuitry 44 on each row 48 is appropriately positioned as discussed above. Once the adhesive 214 has set, the top plate 140 and fence 180 are removed to expose the aligned rows 48 (FIG. 21), as indicated by step 239 in FIG. 11.

Figure 22:
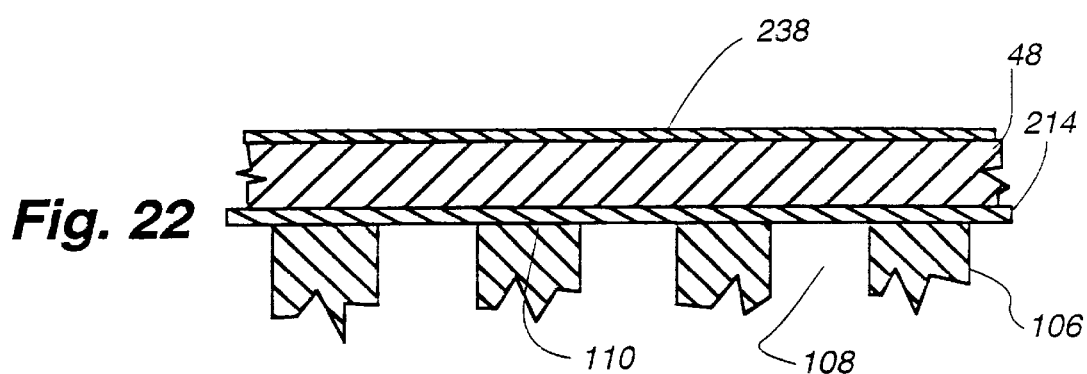
FIG. 22 is a partial representative section of the gang tool of the present invention, illustrating an adhesive sheet positioned on top of the plurality of beams, a row positioned on top of the adhesive sheet, and a layer of photo resist positioned on top of the row.

Photo-resist 238 is then applied by spin-coat or other known method to the top surface 52 of the rows 48, as indicated by step 240 in FIG. 11, and as shown in FIG. 22. With all of the rows 48 mounted on the gang tool 60 in proper alignment, the entire plane defined by the top surfaces 52 of the rows 48 can be coated with resist 238 at once in the same operation.

After the resist 238 has been applied, a reticle, or mask (not shown), is aligned above the platform 86 in a known manner to define the rails 36, in this example all at once, on the planar surface formed by the top surfaces 52 of the plurality of rows 48. This is indicated by step 242 in FIG. 11. Other structures for the air bearing surface 32 may require each row to be aligned separately.

The mask is aligned above the rows 48 by referencing alignment marks 58 positioned one at either end 54, 56 of the row 48 on the top surface 52. Every row 48 has the alignment marks 58, however, in this example, since the rows 48 are precisely aligned with respect to one another, the mask need be aligned only on one row 48. Preferably, the twenty-first row 48 is used as the alignment row.

Figure 23:
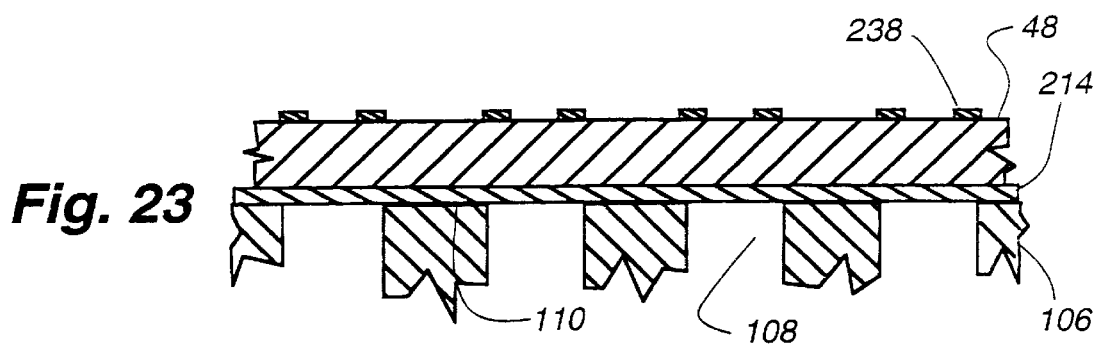
FIG. 23 is a partial representative section of the gang tool of the present invention, illustrating patterned photo resist positioned on top of the row.

With the mask aligned and in place over the photoresist 238 on the rows 48, the photoresist is exposed in a known method, such as by UV light. The mask is removed and the exposed resist is developed by spray developer or by being dipped in a develop tank so as to remove the resist that was exposed to the UV light, as is well known. The undeveloped resist 238 remains where the rails 36 are to be formed across each of the rows 48 continuously along the length of the platform 86 in the direction of the beams 106, as schematically shown in FIG. 23.

The topography of the top surfaces 52 of the rows 48 produced at row bond (220) provides the required flat surface required for high quality resist coating with excellent etch consistency from row to row. The rows 48 on the gang tool 60, in this example, are then aligned and exposed using a full-field mask. The single-row alignment aligns all rows 48 simultaneously and within the required alignment tolerances. Also, because of the flat surface topography, the exposure focal length is consistent from row to row, which results in uniform line-width control. The size and format of the gang tool 60 allows standard photo tooling and equipment to be used. The adhesive 214 is not affected by the developer.

Figure 24:
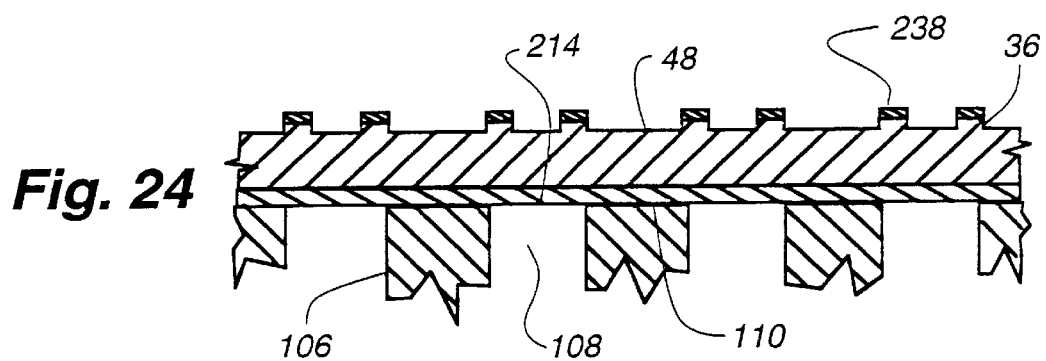
FIG. 24 is a partial representative section view of the gang tool of the present invention, illustrating the profile of the row after the plasma etch step of the PDR process.

The rows 48 are next etched, as indicated by step 244, with a plasma reactive process, preferably in an electron cyclotron resonance etcher. As is known, during the etch step the material not covered by the photo resist 238 is removed while the material under the photo resist 238, defining the rails 36, is not affected, as shown in FIG. 24. A dark space shield (not shown) can be used which covers all of the gang tool 60 except the portion of the rows 48 to be etched, thus eliminating the adverse affects of the etch environment on the gang tool 60 surfaces.

Cooling the gang tool 60 is crucial to obtain the desired etch process and results. The cavity 116 on the bottom surface 80 of the gang 60 is critical to provide this cooling. Cooling and uniform temperature control affect etch uniformity and resist-to-substrate etch selectivity. A cooler gang tool 60 will result in a lower resist etch rate, which will allow the use of thinner resist coatings, which in turn provide for better alignment control and resolution. The size and configuration of the gang tool 60 allow for processing multiple gang tools 60 at a time in the etch process. This factor combined with the compact spacing of the rows allows for high volume, low cost processing.

During the etch process, the gang tool 60 is placed on a fixture 196 having the protrusion 202 that matches shape of the cavity 116, as shown in FIG. 20. The gap 208 formed between the protrusion 202 and the back wall 122, side walls 120, and end walls 118 of the cavity 116 is crucial. For the desired cooling effect, it is important that the dimension of the gap 208 between the two surfaces be no more than the mean-free-path of helium, as described above. One aperture 246 (FIG. 9) is provided in the fixture, for introducing helium from a gas supply (not shown) into the gap and maintaining it at a preferred pressure.

Helium gases introduced into the gap 208 during the etch process, which transfers heat away from the surfaces 52 of the rows 48 through the cavity 116. By providing the gas as close to the rows 48 as possible, efficient cooling is achieved.

After the etch process, the remaining resist is removed to expose the rails defined by the etching process, as indicated by step 248, and FIG. 25.

A trench 42 is then ground between the two rails 36 formed for each slider 30, the trench 42 being a further feature of the air bearing surface 32 in this example. See step 252 in FIG. 11, and FIG. 25. Because the rows 48 are so precisely aligned on the platform 86 of the gang tool 60 in all three directions, a saw (shown in schematic) 250 can conveniently be used to grind the trench 42 in the desired direction and at the directed depth across all of the rows 48 on the gang tool 60. Again, the alignment for the trench 42 grinding is accomplished by simply aligning to one feature on one of the rows 48. The planar topography of the top surfaces 52 of the bonded rows 48 results in uniform trench 42 depth in the rows 48 across the entire platform 86. The trench 42 is cut in a direction parallel to and between the rails 36 formed for each slider 30 as shown in FIG. 5.

Figure 26:
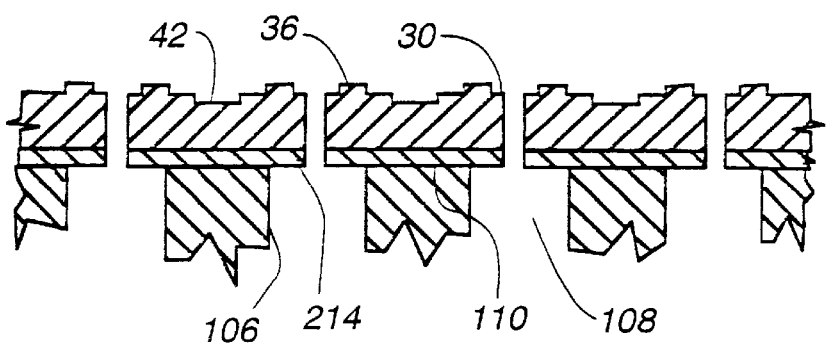
FIG. 26 is a partial representative section of the gang tool of the present invention, and illustrates the individual read/write heads formed by the PDR process and machining.
Figure 27:
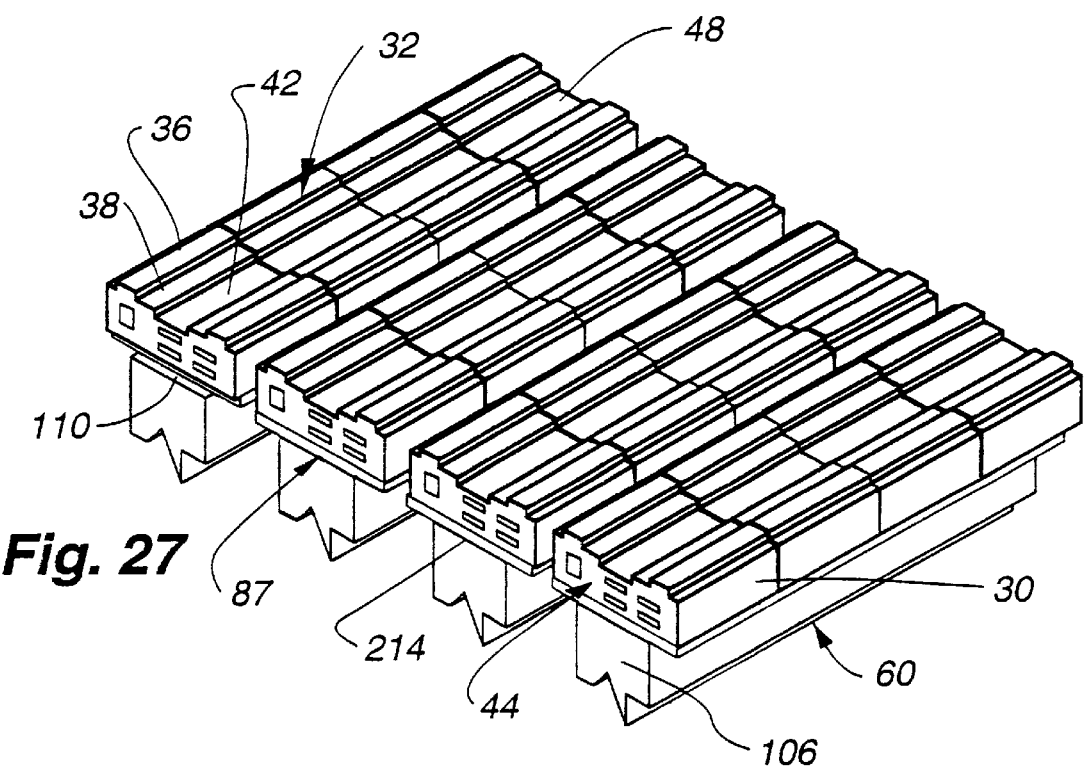
FIG. 27 is an enlarged partial perspective view of the gang tool of the present invention, illustrating the individual read/write heads positioned on the gang tool.

In order to define and separate each individual slider 30, from the row 48 in which it resides, as shown in step 254 of FIG. 11, and in FIG. 26, the saw 250 is used as schematically represented in FIG. 25. The saw 250 is positioned to cut through the consecutive rows 48 in a line positioned over the groove 108 and between the sets of rails 36 defined on each individual slider 30. The saw 250 cuts through the row 48 material and the adhesive 214, the result being best seen in FIG. 27. Since the rows 48 are all aligned precisely with respect to one another in the X 62, Y 64 and Z 66 directions, the alignment of the saw operation is as convenient as the alignment for the exposure and trench grind operations.

In order to debond each individual slider 30 from the top end 110 of the beams 106 for further processing, a solvent is applied to the gang tool 60 to flow through the grooves 108 and under the sliders 30 in order to dissolve the adhesive 214 from several directions. See step 256 in FIG. 11. Each beam 106 on the platform 86 is narrower than the width of the slider 30 such that after the slider 30 has been individually separated from the other sliders in its row 48, the slider 30 overhangs the beam 106 on either side, as shown in FIG. 26. This allows for better access of the solvent to the adhesive. Once the adhesive 214 has been sufficiently dissolved, the individual sliders 30 are removed from the gang tool 60, as indicated by step 258 in FIG. 11, for further individual processing.

The use of the gang tool 60 for batch processing of rows 48 to define air bearing surfaces 32 on individual sliders 30 results in a large increase in throughput, process efficiency and consistency of results. The use of the gang tool 60 provides photoresist uniformity, gang align and expose capability, reduction of handling damage, the elimination of several bonding/debonding operations during machining, and overall high yield/low cost manufacturing of read/write heads.

A presently preferred embodiment of the present invention and many of its improvements have been described with a degree of particularity. This description has been made by way of preferred example and is based on a present understanding of knowledge available regarding the invention. It should be understood however that the scope of the present invention is defined by the following claims, and not necessarily by the detailed description of the preferred embodiment.

The invention claimed is:

1. A method for defining an air bearing surface on each of a plurality of rows, each of the rows comprising a plurality of individual sliders, each row having a first end, a second end and a top surface, the method comprising the steps of:

providing a tool having a platform defining x, y and z-axis reference surfaces;

mounting the rows on the platform such that each slider in each row is oriented identically to corresponding sliders in adjacent rows in the x and y axis directions;

moving the top surfaces of the rows such that the top surface of each row lies in a common plane with all other top surfaces, providing z-axis orientation;

defining an air bearing structure on each of the sliders in the rows while the plurality of rows are oriented and mounted on the platform;

sawing through the plurality of rows between the sliders in each row to form individual sliders; and demounting the individual sliders from the platform.

2. A method as defined in claim 1, wherein the method further comprises the steps of:

applying an adhesive to the platform prior to mounting the rows thereon;

heating the adhesive prior to mounting the rows thereon; and compressing the rows into the adhesive to cause the top surfaces of each of the rows to lie in a common plane.

3. A method as defined in claim 2, wherein the method further comprises the steps of:

readjusting the x-axis orientation after the rows have been compressed into the adhesive.

4. A method as defined in claim 1, further comprising the steps of:

providing a cavity formed in the tool adjacent to and behind the platform;

heating the platform through the cavity during the mounting step; and cooling the platform through the cavity during the defining step.

* * * * *